United States Patent

[11] 3,545,506

[72] Inventor Edward Hopper
 1723 St. Louis, Hot Springs, Arkansas 71901
[21] Appl. No. 799,239
[22] Filed Feb. 14, 1969
[45] Patented Dec. 8, 1970

[54] SUPPORT STRUCTURE
 2 Claims, 3 Drawing Figs.
[52] U.S. Cl. ................................................ 143/32, 143/34
[51] Int. Cl. ...................................................... B27b 17/02
[50] Field of Search ........................................... 143/32, 34, 68; 248/(Inquired)

[56] References Cited
UNITED STATES PATENTS

| | | | |
|---|---|---|---|
| 1,413,310 | 4/1922 | Wunsch ........................ | 143/34 |
| 2,941,555 | 6/1960 | Hornbostel .................... | 143/32 |
| 3,140,736 | 7/1964 | Propst .......................... | 144/34 |

Primary Examiner—Donald R. Schran
Attorneys—Alva H. Bandy, William G. Gapcynski and Lawrence A. Neureither ABSTRACT: This invention concerns a support structure capable of being mounted upon a small boat and capable of carrying a sealed pneumatic saw to be used to eliminate underwater obstacles by cutting off the underwater obstacles below the water line.

PATENTED DEC 8 1970

3,545,506

INVENTOR
EDWARD HOPPER

BY *William G. Gapczynski*

ATTORNEY

SUPPORT STRUCTURE

The invention described herein may be manufactured and used by or for the Government for governmental purposes without the payment to me of any royalty thereon.

BACKGROUND OF THE INVENTION

The present invention concerns a support structure designed to ease the task of removing underwater obstacles. Prior art methods have proved to be inconvenient and costly. The present structure provides an efficient and inexpensive means for the underwater positioning of a sealed pneumatic saw capable of cutting away water hazards.

SUMMARY OF THE INVENTION

The support structure of this invention is designed to place a sealed pneumatic saw below the water level positioned so as to be able to cut through and thus remove hazards to water navigation.

It is an object of this invention to have the support structure be capable of placing a sealed pneumatic saw at any desired depth in the water.

It is another object of this invention to have the support structure capable of removing the sealed pneumatic saw from the water with the minimum of effort.

It is another object of this invention to have the water obstacle constrained by the support structure and the sealed pneumatic saw as the saw is cutting so that the saw can effectively cut through the obstacle.

It is the final object of this invention to have the sealed pneumatic saw controlled by an operator from above the water line.

DESCRIPTION OF THE PREFERRED EMBODIMENT

Figure 2:
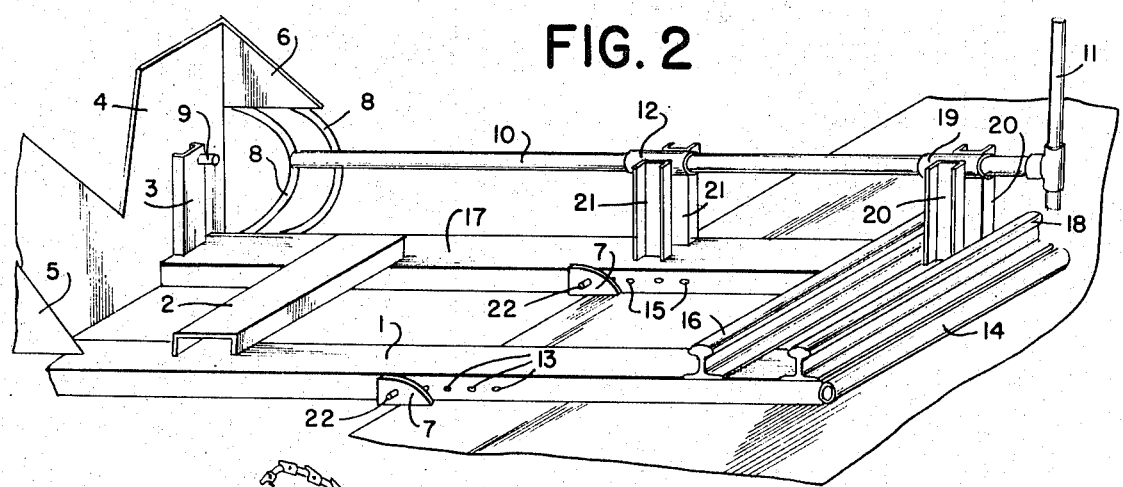
FIG. 2 is a closeup view of the support structure.

The preferred embodiment of the invention consists of tow longitudinal structural members 1 and 17. They are parallel to each other and are rigidly positioned by the fastening to them of structural cross members 16, 18 and 2 as shown in FIG. 2. In this manner a rigid rectangular structure is created. V-grooved plate 4 is welded to the ends of longitudinal structural members 1 and 17 as shown in FIG. 2. Flanges 5 and 6 and rails 8 are affixed as depicted in FIG. 2. These members act as a protective shield for the scaled pneumatic saw. Mounting bar 3 and its pivot rod 9 are affixed to V-grooved plate 4. Control rod 10 rides within its support sleeves 12 and 19. Support bars 20 and 21 are affixed at right angles to longitudinal structural member 17 and position support sleeves 12 and 19 as depicted in FIG. 2. Handle 11 is affixed at right angles to control rod 10. Rotating rail 14 is affixed to longitudinal structural members 1 and 17 as shown in FIG. 2. Adjustment holes 13 and 15 are placed through longitudinal structural members 1 and 17, respectively.

In actual operation, a sealed pneumatic saw is pivotally mounted upon pivot rod 9 with control rod 10 affixed to the saw so that by the rotation of handle 11 about the axis of control rod 10, the sealed pneumatic saw is pivoted about pivot rod 9. The lengths of control rod 10 and longitudinal structural members 1 and 17 can be varied to permit use in any desired depth of water. Adjustment holes 13 and 15 can be any number, five are depicted in FIG. 2. Adjustment holes 13 and 15 give the operator a finer adjustment to the cutting depth of the saw once appropriate lengths of control rod 10 and longitudinal structural members 1 and 17 have been determined.

Figure 1:
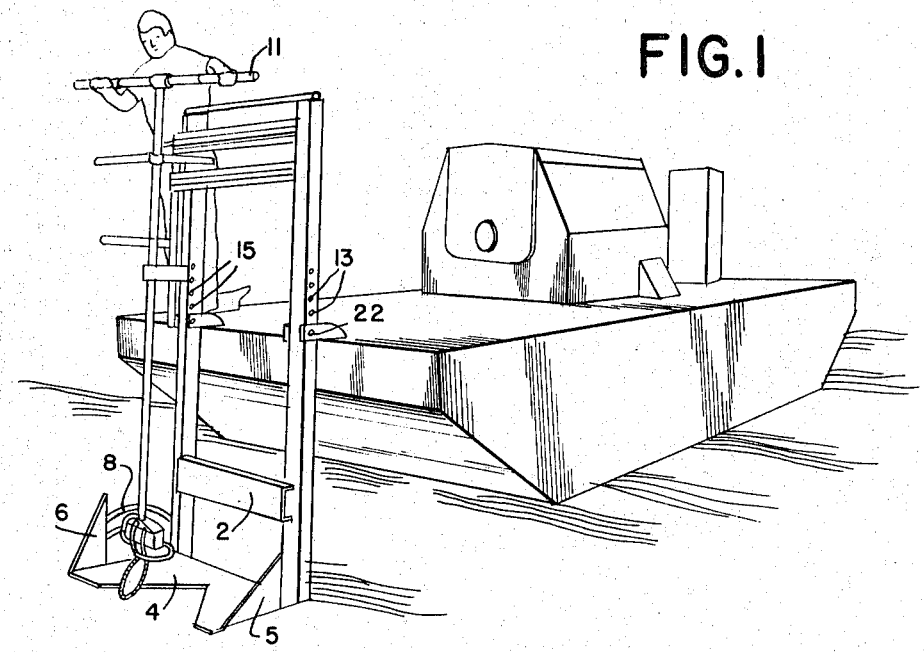
FIG. 1 depicts the support structure as it would appear mounted upon a small craft.

The support structure is easily mountable upon any small boat by the fastening of support plates 7 to the deck of the boat as shown in FIGS. 1 and 2. Support plates 7 contain a hole capable of receiving fastening pin 22. Support plates 7 are spaced upon the deck (FIGS. 1 and 2) so as to be alined with the longitudinal support members 1 and 17 when the support structure is positioned upon the deck. When the support structure is positioned between support plates 7 and the desired adjusting holes 13 and 15 are alined with the respective holes in the support plates 7, fastening pins 22 are inserted. Due to the slight overhang at the edge of the deck of the holes in support plates 7 (FIGS. 1 and 2), the support structure becomes freely rotatable through 90° about fastening pin 22. By simply raising rotating nail 14, V-grooved plate 4 with the attached sealed pneumatic saw is lowered into the water. Structural cross member 16 and rail 18, in addition to providing rigidity to the structure, act as counterweights in the lever-fulcrum arrangement of longitudinal structural members 1 and 17 and support plates 7 with fastening pins 22. The result is the offsetting of the weight of the sealed pneumatic saw and thus the easing of the raising and submerging of the sealed pneumatic saw.

Figure 3:
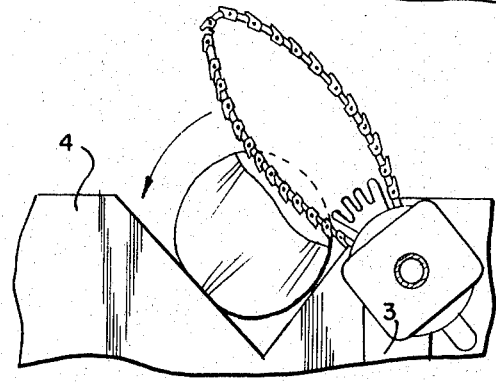
FIG. 3 depicts the manner in which the V-grooved plate of the support structure and the sealed pneumatic saw cooperate to hold an underwater obstacle while the sealed pneumatic saw cuts through it.

To remove an obstacle, the support structure is rotated about pins 22 so as to lower the saw and V-grooved plate 4 into the water. By maneuvering the boat, the obstacle is placed into the "V" of V-grooved plate 4. The operator, by the manipulation of handle 11, cuts off the obstacle by causing the sealed pneumatic saw to rotate in towards the bight of the "V" groove. In this manner, the obstacle is, in effect, held by the sealed pneumatic saw and the "V" groove during the cutting process (FIG. 3) thus achieving an efficient and inexpensive means of removing obstacles.

The support structure of this invention can be made from any number of structural materials, the preferred embodiment being made from conventional stocks of iron. Any number of dimensional relationships may be used depending upon the depth of the water in which the cutting of the obstacles is to take place and the size of the obstacles which are to be removed.

I claim:
1. A support structure comprising:
   a. a first and a second parallel longitudinal structural member containing a number of matching adjustment holes;
   b. a first cross member attached to both of said first and second parallel longitudinal structural members near the same end of each of said first and second longitudinal structural members;
   c. a plate attached at right angles to each of said first and second parallel longitudinal structural members and at the end of each of said first and second parallel longitudinal structural members which is nearest said first cross member;
   d. means attached to said plate near said first parallel longitudinal structural member which are for mounting to said plate a sealed pneumatic cutter;
   e. a rod running parallel to the full length of said first parallel longitudinal structural member for manipulating said sealed pneumatic cutter;
   f. counterweights attached to both of said first and second parallel longitudinal structural members near the end opposite to said plate;
   g. support plates containing holes for alinement with said longitudinal structural members and with the holes contained within said longitudinal structural members; and
   h. fastening pins for rotatably fastening said longitudinal structural members to said support plates.

2. The support structure as described in claim 1 wherein said plate is in the shape of a "V."